Oct. 13, 1942.   H. WATERMAN   2,298,441
ELECTROLYTIC CELL
Filed Jan. 8, 1940
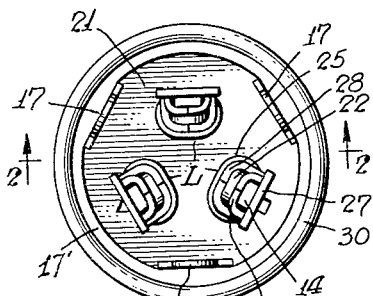
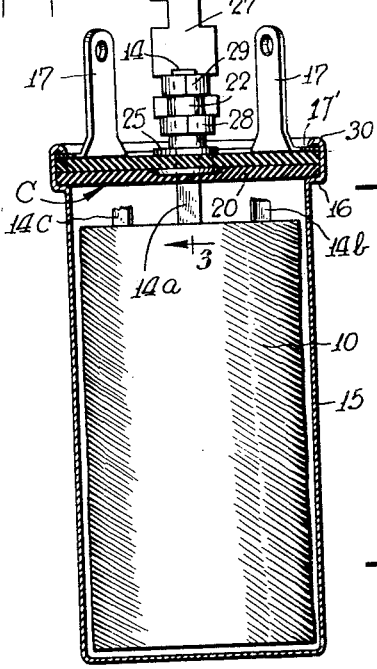
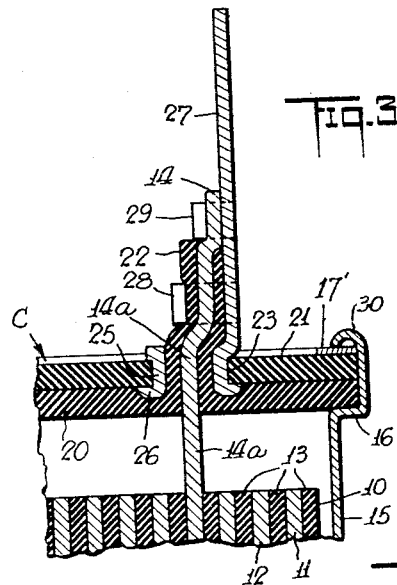
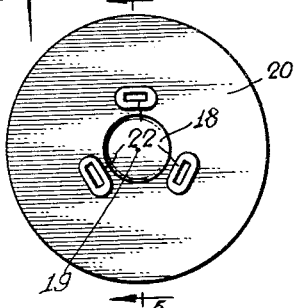
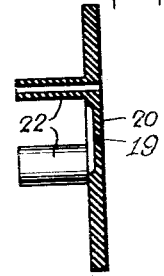
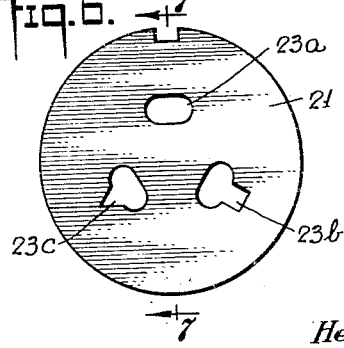
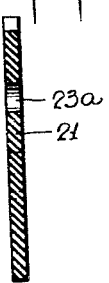
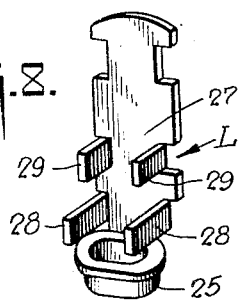
INVENTOR
*Herbert Waterman*
BY
*Dean Fairbank & Hirsch*
ATTORNEYS Patented Oct. 13, 1942

2,298,441

UNITED STATES PATENT OFFICE 2,298,441

ELECTROLYTIC CELL

Herbert Waterman, Collingswood, N. J., assignor to Aerovox Corporation, New Bedford, Mass., a corporation of New York Application January 8, 1940, Serial No. 312,815

7 Claims. (Cl. 175—315)

The present invention is more especially concerned with the terminal mounting closures of electric cells, and has particular utility in electrolytic condensers of the so-called dry type.

Among the objects of the invention are to provide a cover construction by which the exposure for circuit connection of the terminals of the active units within the enclosing container is effected with a seal that is inherently liquid-tight, thereby to preclude disturbance due to the seepage of electrolyte to the exterior, even under severe or unfavorable conditions of operation, due for instance to heat and vibration.

Another object is to provide a rugged cover construction of the above type, made up of a minimum number of parts of simple and inexpensive construction, that may be easily assembled and which lends itself for ease of installation and affords an adequate mechanical and electrical bond, without injury even to a flimsy flexible terminal strip.

A feature of the invention is the use of a specially conformed liquid-tight soft gasket member which is specially conformed to afford a liquid tight seal, not only at the rim of the container housing the unit, but also about the protruding terminals, hard members being associated with said gasket material to effect such rigid tight seals at the required places.

In the accompanying drawing in which is shown one of various possible embodiments of the several features of the invention, Fig. 1 is a plan view showing the cover of the cell, Fig. 2 is a view in longitudinal cross-section taken on the line 2—2 of Fig. 1, Fig. 3 is a longitudinal sectional view on an enlarged scale taken on line 3—3 of Fig. 2, Fig. 4 is a plan view of the inner disk element of the cover unit, Fig. 5 is a view in transverse cross-section taken on line 5—5 of Fig. 4, Fig. 6 is a plan view of the outer disk element of the cover unit, Fig. 7 is a transverse cross-section taken on the line 7—7 of Fig. 6, and Fig. 8 is a perspective view of one of the terminal lugs.

Referring now to the drawing, there is shown an electrolytic condenser of the dry type, the active unit of which comprises a roll 10 of conventional type including two electrodes 11 and 12 at least one of which is of film forming metal with interposed absorbent electrolyte carrying interspacer 13. In the usual multiple wound condenser, comprising two or more condensers wound as a single roll, there are a multiplicity of terminal strips, three such strips 14a, 14b and 14c being illustratively shown in the drawing. These strips in conventional practice are integral with the foil, by being slit therefrom and protrude upward above the roll. The unit impregnated with electrolyte is inserted in a can 15 provided with a shoulder 16 near its rim for accommodating the cover unit C with which the present invention is more particularly concerned. Shoulder 16 may be drawn as a unitary part of the can as shown, or the can may be strictly cylindrical and the cover supported on the upper edge of a liner tube.

In the embodiment shown, the cover unit includes an inner flexible gasket disk 20, desirably of flexible rubber and an outer rigid disk 21, desirably of laminated phenolic sheet material, such as sheet "Bakelite" or other suitable hard plastic. The flexible disk 20 has formed as a unitary and integral part thereof upstanding sleeves 22 for the respective terminal strips. Where this disk is of rubber, said sleeves are molded as integral parts thereof, as shown. The disk 20 is of reduced thickness at its middle 18, and is there perforated as at 19. Sleeves 22 extend through corresponding apertures 23 in the outer rigid disk 21. For the usual type of electrolytic condenser with the flat terminal strips 14a, 14b and 14c shown, the rubber sleeves would have correspondingly wide and thin bores and the sleeves are correspondingly wide and thin as best shown in Fig. 4.

The outer disk 21 carries terminal lugs L preferably of the construction shown in Fig. 8. Each terminal lug has a supporting eyelet 26 extending through corresponding aperture 23 in the outer disk 21 and clinched over the rim of the aperture as at 26. The length 27 of the terminal lug accordingly extends along the corresponding sleeve 22 and along the corresponding protruding upper end 14 of the terminal strip. A pair of lateral wings 28 on the terminal lug are clinched over the rubber sleeve 22 for snug liquid-tight engagement of the latter about the terminal strip as best shown in Fig. 3. The lug also has another pair of lateral wings 29, which are clinched over the protruding end 14 of the respective terminal strips and clamp the latter firmly into electrical and mechanical contact with the terminal lug. If desired, wings 28 and 29 may be connected laterally in a continuous piece as for instance as a tube of two diameters.

The rim of the can is rolled over as at 30 to press the outer disk 21 downward and to force the rim of the inner gasket disk 20 against the shoulder 16. Desirably a ring 17' with integral upstanding lugs 17 may be spun under the rolled rim 30 of the can, said lugs serving as the mounting means for the unit.

In the preferred mode of assembly, the terminal strips 14a, 14b and 14c of the condenser unit are drawn through the respective sleeves 22 and the rigid cover disk 21 with its terminal lugs L eyeleted thereto, is passed over the ends of the respective sleeves to bring the two cover elements in superposition. The condenser unit 10 is now introduced into the can 15, the cover 20, 21 being laid upon shoulder 16, mounting ring 17' is placed over both and the rim of the can is rolled over as at 30. In the final step of the assembly the lateral wings 28 of the terminal lugs are clinched over to compress the sleeve 22 snugly about the terminal strip. Wings 29 are also clinched over to clamp the exposed end 14 of the terminal strip into snug electrical and mechanical contact with the face of the terminal lug. In Fig. 3 of the drawing the thickness of the parts and the magnitude of the bends are greatly exaggerated, more clearly to disclose the details of construction. Despite the flimsiness of the flexible terminals 14a, 14b and 14c, no injury thereto occurs in assembly, for the respective protective sleeves 22 thereabout cushion the pressure applied upon the surface in tightening the lug wings 28. Likewise lug wings 29 clamp the ends 14 of the terminals directly against the respective lugs, without exerting any tearing or shearing stresses thereon.

The flexible rubber disk 20 with its protruding sleeves 22 is thus in effect a specialized gasket which in completely assembled position is tightened by the associated outer rigid disk 21 and the metallic lugs L, for a liquid-proof seal at the only places where leakage could possibly occur, namely at the periphery or rim of the can and about the respective protruding terminals, the gasket material itself being liquid-tight at the area between the respective sealed portions. The aperture 19 in disk 20 serves as a vent which safeguards the condenser against explosion by releasing excessive gas, that may be generated in use due to deformation or imperfect formation of the condenser or connection thereof in circuit with its polarity reversed.

Preferably each aperture in the outer disk 21 has a distinctive shape, aperture 23a being elliptical to be snugly engaged by the correspondingly elliptical eyelet 25 of the lug L, aperture 23b having a rectangular lateral enlargement and aperture 23c a triangular lateral enlargement. Through these enlargements, the rubber disk 20 thereunder is exposed to view. The distinctive shapes of these apertures facilitate identification of the respective terminals.

By the construction set forth, the effectiveness of seal at the rim of the cover is not impaired and the respective rubber sleeves in snugly clamping the terminal strips preclude seepage of any liquid or syrupy ingredients of the electrolyte, even though the can be mounted in reverse position and be subjected to substantial heat and to vibration. As a consequence, the corrosion and the disturbance in delicately balanced circuits, resulting where leakage of such conductive fluid occurs is effectively obviated and this at little or no increase in cost as compared to conventional constructions.

As many changes could be made in the above construction and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent is:

1. An electric cell of the type comprising a container, an active unit therein including a fluid ingredient, said unit having terminals; the combination therewith of a flexible liquid tight gasket having sleeve portions encircling part of the length of the respective protruding terminals, a cover compressing the gasket material against the container at the periphery thereof and metallic means carried by said cover and clasped about said sleeve portions.

2. An electric cell of the type comprising a container having a shoulder near its rim, an active unit therein including a fluid ingredient, said unit having terminals protruding above the rim of the container; the combination therewith of a composite cover including a flexible liquid-tight gasket having a rim resting on said shoulder and sleeve portions unitary therewith encircling the respective protruding terminals, means compressing the rim of the gasket material against said shoulder and metallic terminal lug structures having parts unitary therewith compressing the sleeve portions of the gasket material which encircles the protruding terminals for liquid-tight seal thereat.

3. A liquid-tight cover construction for an electrolytic cell, comprising a flexible inner plate having flexible terminal carrying sleeves rising therefrom, a rigid outer plate superposed over said flexible plate and affording openings for said sleeves, said rigid plate having upstanding terminal lugs secured thereto at the regions of sail sleeves, and having means to clamp the latter for mechanical and electrical connection of the respective terminals.

4. A liquid-tight cover construction for an electrolytic cell, comprising an elastic inner rubber disk with upstanding integral terminal carrying sleeves, a rigid disk superposed over said elastic disk and perforated to accommodate said sleeves, said disk having terminal lugs affixed thereto at the regions of said sleeves, each of said terminal lugs having portions unitary therewith to be clamped respectively about the corresponding sleeve and against said lug beyond said sleeve.

5. A liquid-tight terminal carrying cover for an electrolytic cell, comprising a pair of superposed disks, the outer of which is rigid and the inner elastic, the said inner disk having a plurality of integral upstanding elastic sleeves protruding upward through corresponding apertures in the outer disk, the rigid outer disk having terminal lugs, each having a rigid mount in the corresponding aperture, each of said lugs having lateral wings to clamp the corresponding sleeve and the corresponding terminal.

6. A liquid-tight terminal carrying cover for an electrolytic cell, comprising an elastic rubber disk having upstanding elastic rubber sleeves integral therewith, each sleeve having a narrow rectangular bore for accommodating a flat terminal strip, a rigid disk superposed over said rubber disk and having apertures to accommodate the respective sleeves, terminal lugs having eyelet mounts at the respective apertures, said terminal lugs having one pair of lateral wings clamping the corresponding rubber sleeve against the lug and another pair of wings to clamp the protruding extremity of the corresponding terminal against the lug.

7. In an electrolytic cell of the type comprising a metallic container having a shoulder near its rim, a dry electrolytic condenser unit therein having upstanding terminals; the combination therewith of a composite cover including an inner disk of soft rubber and a superposed outer rigid disk, said cover resting at its rim upon said shoulder, said inner disk having unitary sleeves rising therefrom through corresponding apertures in said outer disk, and through which the terminals extend and from which they protrude, said outer disk having terminal lugs eyeleted about said apertures and clamped respectively to the rubber sleeves and to the protruding ends of the terminals, the rim of said can being rolled inward about the rim of said rigid outer disk to clamp the inner rubber disk against said shoulder.

HERBERT WATERMAN.